US007016135B2

(12) United States Patent
Emberty et al.

(10) Patent No.: US 7,016,135 B2
(45) Date of Patent: Mar. 21, 2006

(54) APPARATUS AND METHOD FOR AUTOMATED INTERCONNECTION AND DISCONNECTION OF DISK DRIVE CARRIER IN A SYSTEM

(75) Inventors: Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 09/898,863

(22) Filed: Jul. 3, 2001

(65) Prior Publication Data

US 2003/0007277 A1    Jan. 9, 2003

(51) Int. Cl.
*G11B 15/18*    (2006.01)
(52) U.S. Cl. .......................................... 360/69; 713/300
(58) Field of Classification Search .................. 360/69, 360/46, 73.07; 361/685, 687; 700/214; 385/88; 714/38; 720/622; 713/300
See application file for complete search history.

(56) References Cited

U.S. PATENT DOCUMENTS

| | | |
|---|---|---|
| 4,787,074 A | 11/1988 | Deck et al. |
| 4,890,894 A | 1/1990 | Kwa |
| 4,924,171 A | 5/1990 | Baba et al. |
| 5,060,211 A | 10/1991 | Blanding |
| 5,155,785 A | 10/1992 | Holland et al. |
| 5,157,319 A | 10/1992 | Klontz et al. |
| 5,204,866 A | 4/1993 | Block et al. |
| 5,229,652 A | 7/1993 | Hough |
| 5,319,509 A | 6/1994 | Michelson et al. |
| 5,325,046 A | 6/1994 | Young et al. |
| 5,341,280 A | 8/1994 | Divan et al. |
| 5,386,487 A | 1/1995 | Briggs et al. |
| 5,455,467 A | 10/1995 | Young et al. |
| 5,471,304 A | 11/1995 | Wang |
| 5,475,216 A | 12/1995 | Danver et al. |

(Continued)

OTHER PUBLICATIONS

U.S. Appl. No. 09/477,547, filed Jan. 4, 2000, Steven J. Buller et al.

(Continued)

*Primary Examiner*—David Hudspeth
*Assistant Examiner*—Fred F. Tzeng
(74) *Attorney, Agent, or Firm*—Jean M. Barkley; Dillon & Yudell LLP

(57) ABSTRACT

A disk drive having an optical signal connector and a magnetic power coupling is placed in a drive carrier. The bottom of the carrier has a recess with a transverse pin mounted in the recess. A pair of small magnets are mounted near the rear of the carrier. The carrier slidably mounts in the drawer of a disk drive library. The drawer has an optical signal connector and a magnetic power coupling that mate with those of the disk drive. The drawer also has a sensor for detecting the magnets on the carrier, and an eject button for manually ejecting the carrier. In addition, a drive mechanism is mounted in the bottom of the drawer for engaging the pin on the bottom of the carrier. Although the carrier may be manually inserted or removed from the drawer, the disk drive library can also perform these functions automatically. The automated sequence is accomplished by inserting the carrier into the drawer until the pin engages the drive mechanism. When the sensor senses the first magnet, the system actuates the drive mechanism to pull the carrier completely into the drawer such that the connectors and couplings interconnect. Proper registration of the carrier in the drawer is verified when the sensor senses the second magnet.

15 Claims, 2 Drawing Sheets

U.S. PATENT DOCUMENTS

| | | | | |
|---|---|---|---|---|
| 5,533,188 | A | 7/1996 | Palumbo | |
| 5,588,728 | A * | 12/1996 | Eldridge et al. | 312/332.1 |
| 5,606,161 | A | 2/1997 | Schulz | |
| 5,644,705 | A | 7/1997 | Stanley | |
| 5,668,696 | A * | 9/1997 | Schmitt | 361/685 |
| 5,712,463 | A | 1/1998 | Singh et al. | |
| 5,712,942 | A | 1/1998 | Jennings et al. | |
| 5,793,909 | A | 8/1998 | Leone et al. | |
| 5,793,919 | A | 8/1998 | Payne et al. | |
| 5,794,238 | A | 8/1998 | Gural | |
| 5,896,387 | A | 4/1999 | Fujita et al. | |
| 5,901,262 | A | 5/1999 | Kobayashi et al. | |
| 5,909,333 | A | 6/1999 | Best et al. | |
| 5,925,119 | A | 7/1999 | Maroney | |
| 5,930,428 | A | 7/1999 | Irwin et al. | |
| 5,995,365 | A * | 11/1999 | Broder et al. | 361/685 |
| 6,031,798 | A | 2/2000 | James et al. | |
| 6,034,928 | A | 3/2000 | Inoue | |
| 6,049,451 | A * | 4/2000 | Schmitt et al. | 361/685 |
| 6,088,221 | A * | 7/2000 | Bolognia | 361/685 |
| 6,166,901 | A * | 12/2000 | Gamble et al. | 361/685 |
| 6,233,143 | B1 * | 5/2001 | Gamble et al. | 361/685 |
| 6,247,944 | B1 * | 6/2001 | Bolognia et al. | 439/157 |
| 6,249,432 | B1 * | 6/2001 | Gamble et al. | 361/685 |
| 6,302,714 | B1 * | 10/2001 | Bolognia et al. | 439/157 |
| 6,370,444 | B1 * | 4/2002 | Kusunoki | 700/214 |
| 6,373,696 | B1 * | 4/2002 | Bolognia et al. | 361/687 |
| 6,407,913 | B1 * | 6/2002 | Peachey et al. | 361/685 |
| 6,419,403 | B1 * | 7/2002 | Buller et al. | 385/88 |
| 6,431,718 | B1 * | 8/2002 | Gamble et al. | 362/85 |
| 6,442,021 | B1 * | 8/2002 | Bolognia et al. | 361/685 |
| 6,449,737 | B1 * | 9/2002 | Tanaka et al. | 714/38 |
| 6,473,297 | B1 * | 10/2002 | Behl et al. | 361/685 |
| 6,483,107 | B1 * | 11/2002 | Rabinovitz et al. | 250/239 |
| 6,512,730 | B1 * | 1/2003 | Lee et al. | 720/622 |
| 6,532,123 | B1 * | 3/2003 | Veenstra et al. | 360/46 |
| 6,565,163 | B1 * | 5/2003 | Behl et al. | 312/223.1 |
| 6,628,518 | B1 * | 9/2003 | Behl et al. | 361/687 |

OTHER PUBLICATIONS

U.S. Appl. No. 09/477,548, filed Jan. 4, 2000, Emberty et al.
U.S. Appl. No. 09/477,546, filed Jan. 4, 2000, Robert G. Emberty et a.

* cited by examiner

APPARATUS AND METHOD FOR AUTOMATED INTERCONNECTION AND DISCONNECTION OF DISK DRIVE CARRIER IN A SYSTEM

The following patent applications are currently pending before the U.S. Patent and Trademark Office and are incorporated herein by reference: U.S. patent application Ser. No. 09/477,547, filed Jan. 4, 2000, entitled, *System and Method for Optically Coupling Component Service Interfaces*; U.S. patent application Ser. No. 09/477,548, filed Jan. 4, 2000, entitled, *Self-Healing Optical Backplane for Coupling Components;* and U.S. patent application Ser. No. 09/477,546, filed Jan. 4, 2000, entitled, *System and Method for Distributing Power Between Components Via a Magnetic Coupling*.

BACKGROUND OF THE INVENTION

1. Technical Field

The present invention relates in general to an improved disk drive handler, and in particular to an improved apparatus and method for automatically interconnecting and disconnecting a disk drive carrier in a library.

2. Description of the Related Art

Hard disk drives (HDD) that are removable during operation in a computer or peripheral systems environment are sometimes referred to as "hot-pluggable." An HDD is typically mounted in a hard disk drive carrier prior to installation in a system. An HDD carrier is a frame-like structure which attaches to the HDD to assist in its insertion into or removal from the system. HDD carriers also protect the HDD when it is outside of the systems environment. HDD carriers are typically constructed out of metal and/or polymeric materials.

In some types of computer hard disk drive applications, the disk drives are provided in a redundant array of independent disks (RAID) for a storage subsystem. Each drive is loaded in a drive carrier and then mounted in a drawer in the subsystem. A drive carrier typically utilizes a cam mechanism in order to latch itself and the disk drive into a drawer. Unfortunately, the lever that operates the cam must be manually actuated to install or remove the drive carrier from the drawer. Thus, an improved mechanism for installing and removing drive carriers that alleviates the need for manual intervention is needed.

SUMMARY OF THE INVENTION

A disk drive having an optical signal connector and a magnetic power coupling is placed in a drive carrier. The bottom of the carrier has a recess with a transverse pin mounted in the recess. A pair of small magnets are mounted near the rear of the carrier. The carrier slidably mounts in the drawer of a disk drive library. The drawer has an optical signal connector and a magnetic power coupling that mate with those of the disk drive. The drawer also has a sensor for detecting the magnets on the carrier, and an eject button for manually ejecting the carrier. In addition, a drive mechanism is mounted in the bottom of the drawer for engaging the pin on the bottom of the carrier.

Although the carrier may be manually inserted or removed from the drawer, the disk drive library can also perform these functions automatically. The automated sequence is accomplished by inserting the carrier into the drawer until the pin engages the drive mechanism. When the sensor senses the first magnet, the system actuates the drive mechanism to pull the carrier completely into the drawer such that the connectors and couplings interconnect. Proper registration of the carrier in the drawer is verified when the sensor senses the second magnet. The carrier is removed from the drawer by pushing the eject button to reverse the previously described sequence. Alternatively, the system can automatically eject the carrier without human intervention.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT EMBODIMENT OF THE PRESENT INVENTION

Figure 1:
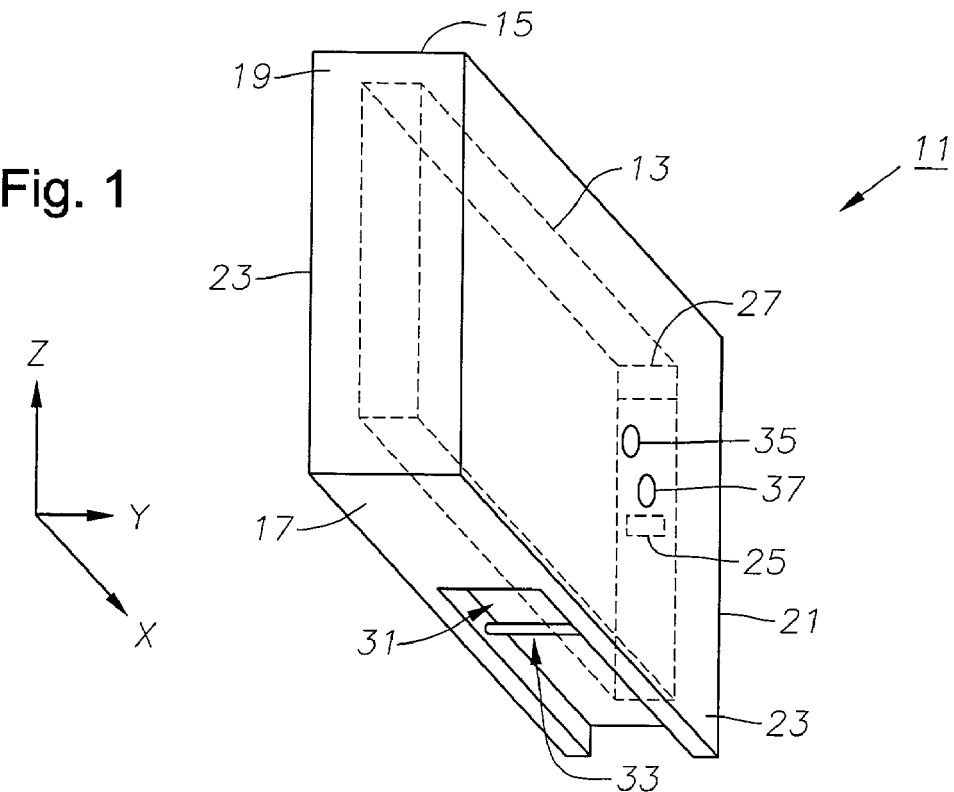
FIG. 1 is a schematic, bottom isometric view of a disk drive carrier constructed in accordance with the invention.

Referring to FIG. 1, a tray or carrier 11 for supporting a disk drive 13 in a unitary drive assembly is shown. A Cartesian coordinate system is provided for reference purposes. Drive 13 may be hermetically sealed for protection and portability. Carrier 11 has generally rectangular features, including a top 15, a bottom 17, a front 19, a rear 21, and sidewalls 23 extending therebetween. In the preferred embodiment, carrier 11 and/or drive 13 has an optical signal connector 25, and a magnetic power coupling 27 located at or near rear 21. Connector 25 and coupling 27 are described in greater detail in the co-pending patent applications that are incorporated herein by reference. In addition, bottom 17 is provided with a generally rectangular trough or recess 31 that extends in an x-y plane forward from rear 21. A pin 33 is transversely mounted in recess 31 such that it extends in a y-direction. A pair of small elements such as magnets 35, 37 are also mounted to carrier 11, preferably near rear 21.

Carrier 11 is designed to be slidably mounted in the slot or receptacle of a drawer 41 (FIG. 2) of a computer system or disk drive library 43. Although disk drive library 43 is shown with only one drawer 41, it is typically provided with a plurality of drawers 41 for a plurality of carriers 11 that may be picked and placed by picking means such as a picking mechanism. Like carrier 11, drawer 41 has generally rectangular features, including a top 45, a bottom 47, a front 49, a rear 51, and sidewalls 53 extending therebetween. Drawer 41 has a self-healing optical signal connector 55, a magnetic power coupling 57, and an optical, magnetic, or Hall-Effect sensor 59, all located at or near rear 51. Connector 55 and coupling 57 are adapted to interconnect with connector 25 and coupling 27, respectively, while sensor 59 is provided for detecting elements or magnets 35, 37, as will be described below. Front 49 has an drive eject button 60 for manually ejecting carrier 11.

Figure 2:
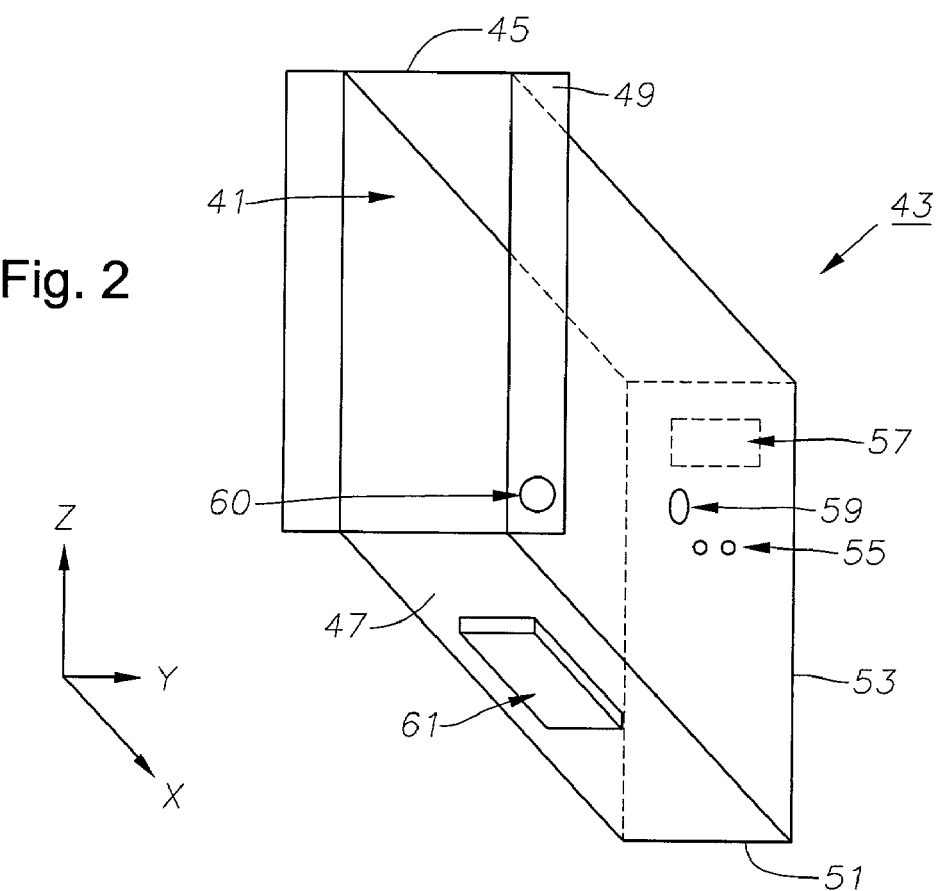
FIG. 2 is a schematic, bottom isometric view of a drawer constructed in accordance with the invention for the disk drive carrier of FIG. 1.
Figure 3:
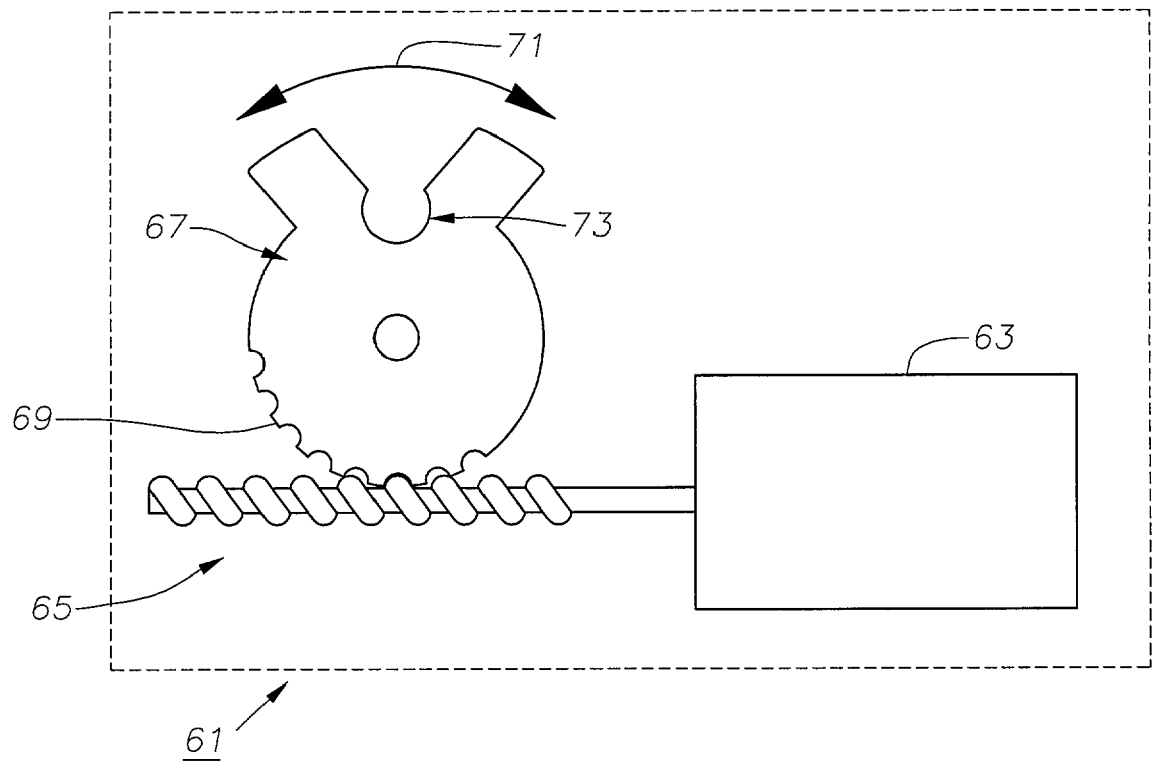
FIG. 3 is a schematic drawing of a drive mechanism utilized by the drawer of FIG. 2.

Referring now to FIGS. 2 and 3, bottom 47 of drawer 41 includes a drive means or mechanism 61 that extends in an x-y plane forward from rear 21. In the preferred embodiment, drive mechanism 61 comprises a motor 63 that drives a worm gear 65, and a pivotally mounted circular wheel or cam 67 having a peripheral worm gear drive 69 driven by worm gear 65. Cam 67 moves in the directions shown by arrows 71, and also has a registration hole 73 for engaging pin 33 on carrier 11.

Figure 4:
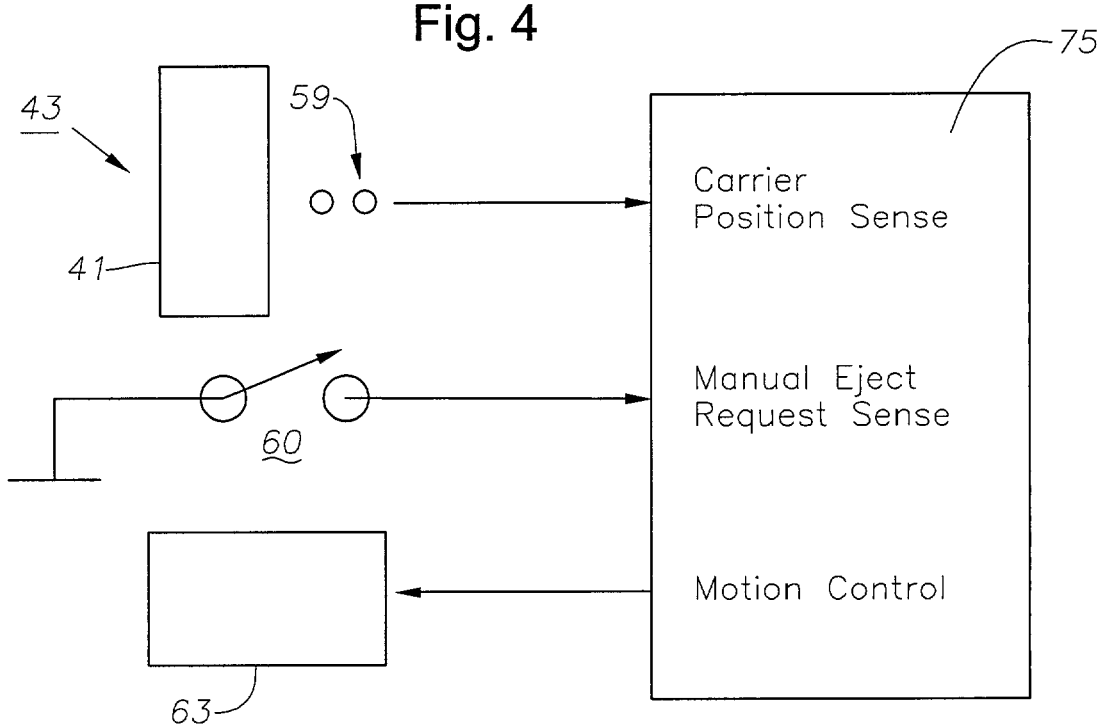
FIG. 4 is an operation diagram of the disk drive carrier and drawer of FIGS. 1 and 2.

In operation (FIG. 4), disk drive library 43 utilizes a controller 75 for monitoring and controlling the previously described components. Although the drive assembly of carrier 11 may be manually inserted into and interconnected with drawer 41, and manually removed and disconnected therefrom by depressing eject button 60, system 43 can also perform these functions automatically in conjunction with the picking means. The automated sequence is accomplished by inserting carrier 11 into the receptacle of drawer 41 only until pin 33 (FIG. 1) contacts and engages registration hole 73 (FIG. 3) in drive mechanism 61. The picking means (or the user, if performed manually) will physically sense this contact. At this point, Hall-Effect sensor 59 senses magnet 35 (FIG. 1) and signals controller 75. Controller 75 then actuates motor 63 (FIG. 3) which drives worm gear 65 to rotate cam 67. The rotation of cam 67 pulls carrier 11 completely into drawer 41 such that carrier 11 is fully seated in drawer 41, and power connectors 25, 55 magnetically couple and signal couplings 27, 57 interconnect. Proper registration of carrier 11 in drawer 41 is verified by Hall-Effect sensor 59 sensing magnet 37, which terminates movement of carrier 11 relative to drawer 41. Disk drive 13 is fully operational in disk drive library 43 at this point.

To disconnect and remove carrier 11 (and, thus, drive 13) from drawer 41, the previously described sequence is reversed. Controller 75 is signaled to reverse motor 63 (if done manually, the user pushes eject button 60 to initiate this sequence), which will rotate cam 67 in the opposite direction to push pin 33 and carrier 11 partially out of drawer 41. The picking means (or user) may then grasp carrier 11 and fully extract it from drawer 41.

Alternatively, controller 75 can automatically eject carrier 11 under some circumstances. For example, if drive 13 experiences a disruption in service, is intermittent, or is experiencing other problems, controller 75 can eject carrier 11 and signal an operator or request maintenance.

The present invention has several advantages including a sensor to detect the presence and location of the drive carrier in the drawer. The system has the ability to automatically eject the drive carrier if, for example, there is a disruption in service. The system is also equipped with a push button for manual ejection of the drive carrier. The drawer has a self-healing optical backplane for optical connectors, and power is provided through magnetic coupling. The drives themselves may be hermetically sealed for protection and portability. Finally, single or multi-slot units may be mounted in a library with automated pickers for storage/retrieval of individual drive carriers.

While the invention has been shown or described in only some of its forms, it should be apparent to those skilled in the art that it is not so limited, but is susceptible to various changes without departing from the scope of the invention.

What is claimed is:

1. A system, comprising:
   a carrier adapted to support a disk drive;
   a drawer having a receptacle;
   a drive mechanism mounted in the receptacle;
   sensor means located in the receptacle for sensing the carrier;
   control means associated with the drawer, the drive mechanism, and the sensor means;
   wherein
      when the carrier is inserted into the receptacle, the sensor means senses the carrier and signals the control means to actuate the drive mechanism to engage and draw the carrier into the receptacle, such that the carrier is fully seated in the receptacle;
      the carrier is unseated and ejected from the drawer by reversing the drive mechanism; and
      the drawer has a self-healing signal connector and a magnetic power coupling that are adapted to interconnect with like components on the disk drive.

2. The system of claim 1, wherein the carrier has a recess containing a pin that is engaged by the drive mechanism.

3. The system of claim 1 wherein the sensor means senses a magnet on the carrier.

4. The system of claim 1 wherein the sensor means comprises a Hall-Effect sensor.

5. The system of claim 1 wherein the self-healing signal connector comprises a self-healing optical signal connector.

6. The system of claim 1 wherein the drive mechanism comprises a motor that drives a worm gear, and a cam that is driven by the worm gear to engage the carrier.

7. A disk drive library, comprising:
   a disk drive carrier having a magnet;
   a disk drive mounted in the carrier;
   a drawer having a receptacle;
   a drive mechanism mounted in the receptacle;
   a sensor located in the receptacle for sensing the magnet on the carrier;
   control means associated with the drawer, the drive mechanism, and the sensor; wherein
      when the carrier is partially inserted into the receptacle, the sensor senses the magnet and signals the control means to actuate the drive mechanism to engage and draw the carrier into the receptacle, such the carrier is fully seated in the receptacle and the disk drive is interconnected with the drawer;
      the carrier is unseated and ejected from the drawer by reversing the drive mechanism; and
      the drawer has a self-healing signal connector and a magnetic power coupling that interconnect with like components on the disk drive.

8. The disk drive library of claim 7 wherein the carrier has a recess containing a pin that is engaged by the drive mechanism.

9. The disk drive library of claim 7 wherein the sensor is a Hall-Effect sensor.

10. The disk drive library of claim 7 wherein the self-healing signal connector comprises a self-healing optical signal connector.

11. The disk drive library of claim 7 wherein the drive mechanism comprises a motor that drives a worm gear, and a cam tat is driven by the worm gear to engage the carrier.

12. A method of interconnecting a disk drive system, said method comprising:

providing a carrier with a disk drive, and a drawer having a receptacle, a drive mechanism, and a sensor;
inserting the carrier into the receptacle;
sensing the carrier with the sensor;
actuating the drive mechanism to engage and draw the carrier into the receptacle, such the carrier is fully seated in the receptacle; wherein said actuating comprises interconnecting self-healing signal connectors and magnetically coupling power connectors on the disk drive and the drawer and
unseating and ejecting the carrier from the drawer by reversing the drive mechanism.

13. The method of claim 12 wherein said sensing comprises sensing a magnet on the carrier.

14. The method of claim 12 wherein said interconnecting self-healing signal connectors further comprises optically interconnecting said self-healing signal connectors.

15. The method of claim 12 wherein said actuating comprises driving a worm gear to rotate a cam to engage the carrier.

* * * * *